Patented Oct. 10, 1944

2,359,858

UNITED STATES PATENT OFFICE 2,359,858

WATER-RESISTANT STARCH AND PAPER CONTAINING IT

Ralph K. Iler, Cleveland Heights, Ohio, assignor to E. I. du Pont de Nemours & Company, Wilmington, Del., a corporation of Delaware No Drawing. Application November 26, 1942, Serial No. 467,061

12 Claims. (Cl. 117—156)

This invention relates to processes for imparting water resistance to starch, to the water-resistant starch so produced, and to improved paper products containing such water-resistant starch. More particularly the invention is directed to processes in which starch is rendered water-resistant by treatment with a water-soluble complex compound of the Werner type in which trivalent nuclear chromium atoms are co-ordinated with carboxylic acido groups having at least ten carbon atoms, is further directed to the water-resistant starch compositions, and is still further directed to water-resistant paper products containing a starch treated with such a Werner type compound.

In the textile and paper trades, starch has been used for many purposes with varying degrees of success. Thus, starch has been used as a body size for textiles and paper, as a coating composition for such materials as paper in conjunction with other materials, and as an adhesive for such products as laminated fibreboard. Starch modified by such treatments as oxidation or chlorination have also been employed for these purposes. In this connection many problems have been encountered and have been solved by various expedients, but one problem has hitherto remained without being adequately solved, namely, the problem of making starch sizings, coatings, and adhesives resistant to the action of water.

It is an object of this invention to provide water-resistant starch compositions and processes for producing them. A further object is to provide improved paper products containing water-resistant starch compositions. A still further object is to provide starch-containing sizes, adhesives, and surface coating compositions which are resistant to deterioration by moisture. Further objects will appear hereinafter.

The foregoing and related objects of this invention are accomplished by processes in which starch is brought into contact with a water soluble complex compound of the Werner type in which trivalent nuclear chromium atoms are co-ordinated with carboxylic acidio groups having at least ten carbon atoms, by the water-resistant compositions so produced, and by improved paper products containing such water-resistant starch.

The water-soluble complex chromium compounds with which starch is treated according to this invention may be prepared by processes in which contact, in the substantial absence of free water, is effected between carboxylic acido groups having at least ten carbon atoms and basic trivalent chromium salts having a basicity no greater than about 50%. Such preparations, employing acyclic acido groups, are described fully in Iler U. S. Patent 2,273,040. Processes using cyclic acido groups, such as abietic, naphthenic, or naphthoic acid groups, are operated as described in my United States patent application Ser. No. 402,995, filed July 18, 1941, that is, by effecting contact, in the substantial absence of free water, of a carbocyclic carboxylic acido group having at least ten carbon atoms with a basic trivalent chromium salt of a monobasic acid, the basicity of the chromium salt being no greater than about fifty per cent. The basic trivalent chromium salt may be one such as described in the above-mentioned U. S. Patent 2,273,040 and contact may be effected as also described therein. Likewise, the terms "free water," "acido group," and "functional acido group" are used herein in the sense defined in the said U. S. patent.

If the functional acido groups are carbocyclic, they must contain more than ten carbon atoms and these carbon atoms must be present in a cyclic structure, but the cyclic structure may comprise a single ring or a number of rings and a portion of the carbon atoms may be present as the side chains. The acidic nature of the group must be due to a carboxyl group, but this may be present either on the cyclic structure directly or on a side chain. Typical, therefore, of the cyclic carboxylic acido groups which may be employed are aryl carboxylic acids such as those having a benzene ring nucleus with carbon chain substitutions on the ring, alpha and beta naphthoic acids, and those having more complicated ring structures such as those derived from phenanthrene. The abietic acid in rosin, being methyldecahydroretene carboxylic acid may be regarded as being of the latter type. The cyclic group may be a saturated ring such as occurs in cyclodecane and its homologues. The ring structure may be aralkyl, containing an aryl group as a substitution on an alkyl group to which the carboxyl group is attached as in the case of naphthyl-acetic, or -propionic acids. It will be seen, therefore, that the functional acido groups may have any configuration so long as there is present a ring structure and the entire group contains at least ten carbon atoms.

It is not necessary that the source of the functional acido group be a chemically pure material and in fact substantial economies may be achieved in many instances by employing naturally occurring mixtures of compounds containing functional acido groups or capable of giving functional acido groups. Thus, naphthenic acids occur naturally in petroleum and may be a mixture of various homologues.

The functional acido groups in the Werner-type complex compounds employed according to this invention may be present as simple coordinated groups held by principal or auxiliary valences to the chromium nucleus or they may be present as bridging groups between two nuclear chromium atoms. Particular acido groups may conveniently be designated by adding the suffix "ato" to the first portion of the name of the carboxylic acid corresponding to the acido group; for instance, stearic acid gives "stearato" groups, palmitic acid gives "palmitato" groups, oleic acid gives "oleato" groups, and abietic acid gives "abietato" groups.

The chromium compounds with which starch is treated according to a process of this invention are complex compounds of the Werner type and are not to be confused with normal chromium salts. Thus a composition which may be employed and in which the carboxylic acido groups are stearato groups, $CH_3(CH_2)_{16}COO$, differs radically in chemical composition from the normal chromic stearate as is clearly evident from the fact that normal chromic stearate is insoluble in water. The fact that the functional acido groups in the Werner type compound are inside, rather than outside of the coordination spheres of the chromium atoms probably accounts for the solubility of the compositions in water. It will be understood that there may be more than one chromium atom within the complex and that the chromium atoms may be held together by bridging groups other than acido groups, so that for each functional acido group there may be several nuclear chromium atoms within the complex, it being necessary only that within the complex there is at least one nuclear trivalent chromium atom coordinated with a functional acido group. Preferably, however, the number of chromium atoms per carboxylic acido group having at least ten carbon atoms will not be more than about ten.

According to the present invention water-resistance may be imparted to any starch. In describing this invention, the term "starch" is used in a generic sense to include the familiar soft, white, amorphous powders which are derived from many different plant cells and which are carbohydrates or polysaccharides having the empirical formula $(C_6H_{10}O_5)_x$. The term "starch" is used in a broad generic sense to include also modified starches such as the products obtained by treating starch with oxidizing or chlorinating agents. The term also includes dextrinized starches. The starch particles may be swelled or unswelled; that is they may have been subject to treatments such as with boiling water to hydrate the starch and cause the granules to expand or burst. To all such starches, whether modified or unmodified, a considerable improvement in water-resistance may be imparted by treatment with a water-soluble complex chromium compound of the Werner-type in accordance with the process of this invention.

The starch treated may be derived from any origin and there may be used, for instance, starch from wheat, rice, corn, cassava root, or of other vegetable origin.

According to the present invention, water-resistance is imparted to starches by processes in which contact is effected between the starch and a water-soluble complex compound of the Werner type in which trivalent nuclear chromium atoms are coordinated with carboxylic acido groups having at least ten carbon atoms. Such contact may be effected in any suitable medium but it is preferred to prepare a solution or dispersion of the starch in water and to add the complex compound to this solution or dispersion. For some purposes, however, in which the presence of water is undesirable, contact may be effected in another suitable medium such as alcohol, in which the complex compound of the Werner-type is soluble.

While any proportion of water or other dispersing medium may be used, the proportion will preferably be confined to the minimum necessary for obtaining uniform dispersion of the starch. The proportion of water to starch by weight may, for instance, be from about 8:1 to 2:1, and more particularly, excellent results are obtained using about 3 parts of water per part of starch.

The complex chromium compounds of the Werner-type may be added to the starch in any manner capable of effecting intimate contact of the chromium compound with the starch. One method which has proved particularly feasible on a commercial basis is to add the complex chromium compound in the form of a concentrated alcoholic solution to the starch dispersion in water with effective agitation. By this method almost instantaneous dispersion of the chromium compound is obtained and intimate contact between the starch and the chromium compound is immediately effected.

The proportion of complex chromium compound used relative to the starch may be widely varied although for economic reasons it is desirable that the proportion used be confined to the minimum required to give the desired degree of water-resistance in the final composition. It will vary, of course, depending upon the use to which the composition is to be put, and may be readily ascertained by those skilled in the art by means of a few simple tests under the particular conditions surrounding such use. The proportion of complex chromium compound will rarely exceed 20 per cent by weight of the starch and ordinarily excellent results will be obtained using not more than about 5 per cent.

The novel water-resistant starch compositions of this invention resemble the corresponding untreated starch compositions in their physical properties with the exception of the property of water-resistance. Thus the tackiness, rate of set upon drying, and other adhesive properties of aqueous dispersions of the treated starch are not substantially altered by reason of the treatment although their viscosities tend to be increased somewhat.

If the Werner-type complex chromium compound used for treating the starch is used in relatively large amounts, that is, more than about five per cent based on the weight of the starch, and if the complex compound contains acid-forming ions, such as chloride ions, the acidity of aqueous dispersions of treated starch may tend to increase due to hydrolysis of the acid-forming ions. If this acidity is undesirable, as when the starch is to be applied to paper products which might be tendered thereby, the acidity may be neutralized by carefully adding dilute aqueous ammonia solution or with a buffering salt such as sodium acetate, with violent agitation. Desirably, the pH of the solution may be thus raised to between 4.5 and 6.0.

Hydrophobic properties are imparted to starch according to this invention as evidenced by the ability of the treated starch to resist swelling and to tolerate the presence of substantial proportions of water without becoming slimy. Obviously, the hydrophobic properties are readily discernible only in the products that have been dried down; that is, a starch treated with Werner complex chromium compound in aqueous dispersion in accordance with this invention is potentially water-resistant, even though dispersed in water, and this water-resistance is immediately apparent when the starch is dried. Such aqueous dispersions capable of being dried to water-resistant compositions, as well as the dried compositions, are important embodiments of this invention.

By reason of their water-resistant character, the compositions of this invention are particularly well adapted to inclusion in paper products. The compositions may be included in the paper as a constituent of a water-resistant surface coating or body size, or they may be included as a water-resistant adhesive in such products as laminated fibreboard or corrugated fibreboard. As used in the present application, the term "paper" is used in a generic sense to include laminated and corrugated fibreboards as well as paper sheet and paper board.

A paper product of this invention which includes a water-resistant starch is characterized by its ability to withstand deterioration by moisture. For instance, a box made from such corrugated board may be stored in a damp place with much less danger of falling to pieces than a similar container made with starch adhesives heretofore available. The improved fibreboards of this invention likewise are less susceptible to attack by fungi or other micro-organisms, probably by reason of their chromium content.

The practice of this invention may be more readily understood by reference to the following illustrative examples:

*Example I*

A water-resistant starch composition of this invention was made up in the following manner: In 378 parts by weight of water, there was dissolved 2 parts by weight of sodium hydroxide. To this solution there was added 140 parts by weight of pearl corn starch with stirring, and the mixture was gently heated to 185° F. for ten minutes. A separate solution was prepared by dissolving three parts by weight of borax in sufficient water to dissolve the borax and adding one-half part by weight of sulfonated castor oil and one-half part by weight of a commercial formalin solution. This solution was then added to the starch solution and thoroughly mixed.

To one-half of the solution prepared as above, there was added fourteen parts by weight of a 33 per cent solution of stearato chromic chloride in isopropyl alcohol which was prepared in the following manner: In a glass lined reaction vessel equipped with a stirrer and reflux condenser 1279 parts by weight of stearic acid was dissolved in 11,200 parts by weight of anhydrous carbon tetrachloride, 207.5 parts of anhydrous ethyl alcohol was added to act as a reducing agent for the chromyl chloride subsequently to be used, and the solution was brought to a gentle boil under reflux. To this solution there was added gradually 6200 parts by weight of a solution prepared by dissolving 1400 parts of chromyl chloride in 4800 parts of anhydrous carbon tetrachloride. During this addition an exothermic reaction took place which maintained the solution at boiling temperature without the application of external heat. After addition of the chromyl chloride solution had been completed in two hours, the reaction mixture was refluxed for an additional one-half hour. At the end of this time, the reflux liquid was slightly yellow in color, indicating the presence of unreduced chromyl chloride, and to complete the reduction 20 parts by weight of anhydrous ethyl alcohol dissolved in 128 parts of carbon tetrachloride was added, after which the reflux liquid became colorless. Refluxing and stirring of the reaction mixture was then continued for an additional two hours to insure completion of reaction. The carbon tetrachloride was then distilled out of the product. There was obtained as a product a dark green glassy solid having an analysis:

| | Per cent |
|---|---|
| Combined chromium | 17.03 |
| Combined chlorine | 18.38 |
| Combined stearic acid | 43.0 |
| Combined acetic acid | 9.7 |

In order to purify this reaction product, it was dissolved in the minimum amount of anhydrous methanol required to effect such dissolution at 60° C. This methanol solution was then chilled to 15° C. with constant stirring, a small part of the solute crystallizing out. This methanol-insoluble portion comprised about ten per cent by weight of the original anhydrous product and was found to be also water insoluble. The methanol-soluble portion, on the other hand, was found to be completely soluble in water. A 33 per cent solution of the methanol-soluble portion was made by distilling out the methanol and replacing it with isopropyl alcohol.

The mixture of starch solution and stearato chromic chloride prepared as above described was stirred well to insure effective contact of the stearato chromic chloride with the starch. A portion of the mixture was dried down and it was found that the dried product was definitely hydrophobic, that is, it resisted re-wetting and softening by water. A portion of the starch solution which had not been treated with stearato chromic chloride was similarly dried down and was found to be definitely hydrophilic, that is, was found to be easily re-wetted by water.

An improved fibreboard of this invention was made up by gluing together two strips of chip board of the type used in laminated board manufacture, employing as an adhesive the starch solution modified with stearato chromic chloride. The laminated fibreboard produced was dried under pressure for a short time, heated to 100° C. for 30 seconds, and then permitted to age for one month. Thereafter, the laminated fibreboard was allowed to soak in water and it was found that the board was definitely resistant to deterioration by water at the adhesive bond. A laminated fibreboard made with a similar starch solution which had not been modified with stearato chromic chloride was found to be rapidly deteriorated by water, the adhesive bond being rapidly softened and the board being readily pulled apart at the adhesive joint.

The production of a coated paper of this invention is described in the following example:

Example II

A coating composition containing a water-resistant starch was made up in the following manner. To 1200 parts by weight of cold water there was added 300 parts by weight of a dextrinized starch known as "satin coating gum" and the mixture was heated to 190° F. for about five minutes. The solution was then cooled and sufficient acetic acid was added to lower the pH to about 5.3. A separate solution of stearato chromic chloride was prepared by adding 56 parts by weight of a 33 per cent solution of stearato chromic chloride, prepared as described in Example I, to 144 parts of water with violent agitation. Of the cooked starch solution 125 parts was then mixed thoroughly with 13 parts of the diluted stearato chromic chloride solution and 25 parts of water. The pH of the mixture was then adjusted to 6.0 by the addition of aqua ammonia containing 5% by weight of $NH_3$.

A clay slip was made by mixing 1000 parts by weight of Georgia kaolin clay with 500 parts by weight of water in a pug mill. During the mixing 2 parts by weight of sodium hexameta-phosphate were added.

To the stearato chromic chloride-modified starch solution there was slowly added 150 parts by weight of the above described clay slip with continuous agitation.

The water-resistant starch coating composition, as modified by the inclusion of the clay, was used for coating paper as follows: The coating composition was applied by means of a blade applicator to a 60 pound per ream ground-wood-coating-stock in such a manner that a coating weight of about 10 to 15 pounds per ream was obtained on the paper after it had dried. The coated sheets were then dried by application of heat in a conventional manner and the physical properties of the coated papers were examined.

It was found that the paper coated with the water-resistant starch-clay composition was definitely water-repellent; ink did not spread on its surface; and when wetted and rubbed with a finger the surface was substantially water-resistant. This water-resistance was further demonstrated by placing a drop of water on the surface of the coated paper and pressing upon it a piece of black glazed paper and permitting it to dry partially. When the black paper was stripped from the coating, very little coating material adhered to the black paper test strip.

A coated paper prepared in a similar manner except that the starch in the coating composition was not modified by contact with stearato chromic chloride, gave no evidence of water-repellency; ink spread upon its surface; and when wetted and rubbed with the finger it was found to become slimy. When a drop of water was placed on the coated paper and a black paper test strip applied, the coating in the wetted area stuck to the black paper and was stripped off when the black paper was removed.

The treatment of a starch with a Werner-type complex chromium compound containing coordinated carbocyclic carboxylic acido groups having at least ten carbon atoms is described in the following example:

Example III

A starch solution was made up as described in Example I, the solution ultimately containing 388 parts by weight of water, 2 parts sodium hydroxide, 140 parts of pearl corn starch, 3 parts of borax, ½ part of sulfonated castor oil, and ½ part of commercial formalin solution.

To one-half of the starch solution so prepared, there was added 14 parts by weight of a 33 per cent solution of abietato chromic chloride in ethyl alcohol which was prepared in the following manner:

In a glass-lined reaction vessel equipped with a stirrer and reflux condenser 101 parts by weight of rosin was dissolved in 1600 parts of anhydrous carbon tetrachloride and the solution was brought to a gentle boil under reflux. A solution containing 103 parts of chromyl chloride dissolved in 400 parts of carbon tetrachloride was then slowly added over a period of one hour with violent agitation. After the chromyl chloride solution was added, the mixture was refluxed for one-half hour. During the course of the reaction the chromyl chloride was reduced to a basic trivalent chromium compound by reaction with a part of the rosin and this trivalent chromium compound coordinated with the remainder of the rosin to form a complex compound of the Werner type.

The reaction product was insoluble in carbon tetrachloride and was removed by filtration. After being dried at 100° C., 214 parts of product were obtained as a dark, brownish-green powder which was completely soluble in alcohol.

The dried product was dissolved in ethyl alcohol to a strength of 33 per cent and used for treating the starch by adding the alcoholic solution to the starch solution with effective agitation. The solution so obtained was dried down and the dried product was found to be definitely hydrophobic, that is, resistant to swelling and softening by water. A portion of the untreated starch solution when similarly dried down was hydrophilic, being readily swelled and re-dispersed by water.

In another embodiment of this invention, starch may be treated with a water-soluble complex compound of the Werner type in which trivalent nuclear chromium atoms are coordinated with carboxylic acido groups having at least 10 carbon atoms and in which there is present a minimum of coordinated acetato groups. A starch so treated is particularly applicable for uses in which the treated material cannot, for one reason or another, be subjected to elevated temperatures. For instance, when it is desirable to develop water-repellency by drying at ordinary temperatures a Werner complex compound low in coordinated acetato groups may advantageously be used. The preparation and use of a starch of this type is described in Example IV.

Example IV

A stearato chromic chloride solution low in coordinated acetato groups was prepared as follows:

To 52.35 parts by weight of carbon tetrachloride contained in a suitable steam jacketed reaction vessel fitted with stirrer and reflux condenser, there was added 5.55 parts by weight of stearic acid and 0.81 part of 95% ethyl alcohol and the mixture was brought to reflux temperature. To the refluxing solution in the reactor there was added 36.2 parts by weight of a solution containing 16.6% by weight of chromyl chloride in carbon tetrachloride, the rate of addition being constant and the addition being completed in one hour. During the same interval there was added simultaneously 4.62 parts by weight of ethyl alcohol. During this hour no chromyl chloride was present in the refluxing fluid. The reflux condenser was then changed to distilling position and the contents of the reaction vessel were distilled for one hour at a temperature, in the liquid, of 212° F. and for another hour at a temperature in the liquid of 282° F. A high vacuum was then applied and distillation was continued for an additional three hours at 282° F. liquid temperature until no more distillate came over. The contents of the reaction vessel was then dissolved in sufficient isopropanol to give a solution containing 33% by weight of solids. This solution was found by analysis to contain the following:

| | Per cent by weight |
|---|---|
| Combined chromium | 5.0 |
| Combined chlorine | 6.72 |
| Combined stearic acid | 14.00 |
| Combined acetic acid | 0.89 |

The stearato chromic chloride solution low in coordinated acetato groups, prepared as above described was applied to starch in the following manner:

The 33% isopropanol solution was diluted by pouring one part of the solution into nine parts of water. The resulting solution was neutralized to pH 4.7 with dilute sodium hydroxide solution. The resulting solution was applied by means of a brush to a starch-coated paper and the starch coating so treated was dried. It was found that the treatment with stearato chromic chloride imparted definite water-repellency to the starch coating. The rate at which water-repellency developed was greatly accelerated by heating during the drying operation.

A rapid rate of development of water-repellency on the starch coating was attained without heating the treated starch coating by boiling the dilute aqueous solution above described before neutralizing it with sodium hydroxide. This boiling was continued for ten minutes after which the solution was cooled to 35° C., neutralized to pH 4.5 and applied to a starch coating on the paper. Upon air-drying at ordinary temperature, 70° F., the treated starch coating became extremely water repellent.

*Example V*

A product even lower in coordinated acetato groups than that of Example IV was prepared by a method exactly similar to Example IV except that instead of the .81 part and 4.62 parts by weight of ethyl alcohol, 1.0 and 5.7 parts, respectively, of isopropanol were used. A 33% solution in isopropanol of the products so obtained was found by analysis to contain the following:

| | |
|---|---|
| Combined chromium | 5.0 |
| Combined chlorine | 5.0 |
| Combined stearic acid | 14.3 |
| Combined acetic acid | 0.54 |

This solution was used for imparting water-repellency to starch in the following manner:

To 100 parts by weight of an 8% starch solution at 70° C. there was added sufficient acetic acid to lower the pH to 4.5. To this solution was added 13 parts by weight of the 33% solution of stearato chromic chloride in isopropanol with vigorous stirring. The mixture became somewhat thick but was not a gel. This mixture was applied as a coating by means of a brush to one side of a piece of sized paper, and the coating was air dried. The dried coating was water-resistant and water-repellent. The degree of water-repellency and the rate in which it developed were increased by heating the dried coating for a short time, that is two minutes, at 220° F.

It is observed that the acetic acid used for lowering the pH of the starch solution in this example did not interfere with the development of water-repellency, because it was not present as coordinated acetato groups.

While in the foregoing description of this invention there have been shown certain specific water-resistant starch compositions and processes for making them and certain specific water-resistant fibreboard products, it will be understood that one skilled in the art may employ numerous processes and compositions and produce numerous products without departing from the spirit of this invention.

I claim:

1. In a process for producing a water-resistant starch the steps comprising bringing the starch into contact with a water-soluble complex compound of the Werner-type in which a trivalent nuclear chromium atom is coordinated with a carboxylic acido group having at least ten carbon atoms.

2. In a process for producing a water-resistant starch the step comprising bringing starch into contact with stearato chromic chloride.

3. In a process for producing a water-resistant starch the step comprising bringing starch into contact with abietato chromic chloride.

4. In a process for producing a water-resistant starch the step comprising bringing starch into contact with oleato chromic chloride.

5. A composition comprising the reaction product of a starch and a water-soluble complex compound of the Werner type in which a trivalent nuclear chromium atom is coordinated with a carboxylic acido group having at least 10 carbon atoms.

6. A composition comprising the reaction product of a starch and stearato chromic chloride.

7. A composition comprising the reaction product of a starch and abietato chromic chloride.

8. A composition comprising reaction product of a starch and oleato chromic chloride.

9. An article comprising paper containing a reaction product of a starch and a water soluble complex compound of the Werner type in which a trivalent nuclear chromium atom is coordinated with a carboxylic acido group having at least 10 carbon atoms.

10. An article comprising paper containing a reaction product of a starch and stearato chromic chloride.

11. An article comprising paper containing a reaction product of a starch and abietato chromic chloride.

12. An article comprising paper containing a reaction product of a starch and oleato chromic chloride.

RALPH K. ILER.